United States Patent [19]
Thornton

[11] Patent Number: 6,141,836
[45] Date of Patent: Nov. 7, 2000

[54] OVER-CENTER LOAD BINDER HAVING A LOCKABLE LATCH

[76] Inventor: Sean E. Thornton, 626 Lillian St., Pittsburgh, Pa. 15210

[21] Appl. No.: 09/286,895

[22] Filed: Apr. 6, 1999

[51] Int. Cl.[7] ........................................ B66F 3/00
[52] U.S. Cl. ........................ 24/270; 24/68 CT; 254/120
[58] Field of Search ........................ 24/68 CD, 68 CT, 24/270; 254/120; 280/179; 70/18; 410/100, 156

[56] References Cited

U.S. PATENT DOCUMENTS

| | | | |
|---|---|---|---|
| 1,636,638 | 7/1927 | Jenkins | 24/270 |
| 2,512,491 | 6/1950 | Durbin | 24/270 |
| 3,271,007 | 9/1966 | Ratcliff | 24/270 |
| 3,418,008 | 12/1968 | Durbin | 24/270 |
| 3,591,141 | 7/1971 | Ratcliff | 24/270 |
| 3,954,252 | 5/1976 | Lyons | 24/270 |
| 4,683,728 | 8/1987 | Hailey | 70/18 X |
| 4,756,181 | 7/1988 | Appelgren | 254/120 X |

*Primary Examiner*—Anthony Knight
*Assistant Examiner*—Robert J. Sandy
*Attorney, Agent, or Firm*—James Ray & Associates

[57] ABSTRACT

An over-center load binding apparatus for interconnecting two tension members and tightening them towards one another, which includes a yoke, a first tension member pivotally connected to the yoke, an elongated pivot arm having a first end pivotally connected to the yoke, a second tension member connected to a second end of the elongated pivot arm, whereby the elongated pivot arm adapted to be pivotal between an open position and a closed position in which the second end thereof to which the second tension member is connected, will pass arcuately around the first tension member to an over dead-center position, a lever arm connectable to the yoke for forcibly pivoting the yoke to dispose the elongated pivot arm in the closed position, a latch for latching the elongated pivot arm in the closed position, and a key lock mechanism incorporated within the yoke for locking the latch while the latch is latching the elongated pivot arm in the closed position.

20 Claims, 4 Drawing Sheets

OVER-CENTER LOAD BINDER HAVING A LOCKABLE LATCH

FIELD OF THE INVENTION

This invention relates generally to load binding devices as are commonly utilized to bind together and tie-down loads on load carrying vehicles such as flat bed trucks, railway cars and the like. More particularly, this invention relates to a unique and improved load binding device of the "over-center" type which includes not only a positive latch to hold and maintain the load binder in a fully tightened position, but further includes a key lock mechanism to lock the positive latch in such a latched position thereby preventing unauthorized persons from tampering with, and possibly releasing the load binder, to prevent loss of the load during transportation, as well as safeguarding against theft of the load and/or load binder.

BACKGROUND OF THE INVENTION

Load binding devices and apparatus for interconnecting two tension members and tightening them towards one another are well known, particularly in the transportation art, and are commonly utilized to bind and tie-down heavy loads onto truck beds, railroad cars and the like. Such devices, more commonly referred to as "load binders" or merely "binders", normally utilize either one of a lever mechanism, a ratcheting mechanism or a screw mechanism to draw together a pair of tension members such as a pair of short-length cables or chains. In use, the pair of cable or chains are hooked to other such cables or chains engaging the sides of a truck bed or railway car bed such that in combination, such cables/chains and the load binder can be pulled tightly over a load and thus utilized to effectively secure a load of almost any dimension to a truck or railway car bed for transportation purposes. Particularly common are load binders of the "over-center" type whereby a pivotal lever mechanism is utilized to pull an end of one such tension member towards another such that the pulled and tensioned end of one tension member is caused to rotate in an orbit about the other, so that when the orbital movement is blocked after slightly more than a 90° rotation; i.e., over a dead-center position, the tensioned ends will be effectively locked by the biasing force tending to force rotation beyond 90°; i.e., over the dead-center position. Examples of such over-center type load binders can be found in U.S. Pat. Nos. 3,726,507; 3,826,469; 3,842,426; 3,954,252 and 4,062,206, which are incorporated herein by reference.

While most such prior art load binders are effective for their intended uses, such as use on flat bed trucks, truck trailers, and the like, such uses not only expose the load binder to the elements, but also expose them to third parties and virtually anyone who may be tempted to tamper with the load binder, or to steal the load or even the load binder itself. Indeed, most load binders tend to be somewhat costly, so that the theft of a load binder from a truck bed, even one in use binding a load, is not particularly uncommon. In this regard, it is noted that U.S. Pat. No. 3,954,252 to Lyons, teaches an over-center type load binder in which a conventional padlock can be utilized to lock-down a tightening lever arm, and U.S. Pat. No. 4,062,206 to McWhorter, teaches an over-center type load binder which utilized a special keeper link within the a chain tension member which includes a keeper disk adapted to receive a special conical boss attached to the pivot handle adapted to lock the pivot handle against the chain tension member. While either of these two systems are effective, the locking mechanisms; i.e., the padlock or the keeper disk and boss, are exposed to the elements, and also exposed to tampering by anyone who may be tempted to do so.

SUMMARY OF THE INVENTION

This invention is predicated on my conception and development of a new and improved load binder of the over-center type which utilizes a unique and improved yoke and an elongated pivot arm combination to bring together and tighten a pair of tension members and includes not only an internal positive latch to hold, maintain and lock the load binder in a fully tightened position, but further includes an internal, unexposed key lock mechanism to virtually lock the positive latch in such a latched position thereby preventing unauthorized persons from releasing the load binder, and preventing loss of the load during transportation as well as safeguarding against theft of the load and/or load binder. By virtue of the internal positive latch and internal key-lock mechanism, the load binder of this invention is virtually tamper-proof. In a preferred embodiment of the invention, the internal key-lock mechanism is protected from the elements and can be even waterproofed, if so desired.

In essence, the load binder of this invention is of the over-center type and includes a rather unique yoke having a first tension member pivotally connected thereto with an elongated pivot arm also pivotally connected thereto. A second tension member is connected to an outer free end of the elongated pivot arm, with the elongated pivot arm being adapted to be pivoted to a tightened position whereby the outer free end thereof to which the second tension member is connected, is pivotal to pass over the first tension member in an over dead-center pivotal movement. An internal latch means is provided within the yoke for latching the elongated pivot arm in such a tightened position, while a lever arm connectable to the yoke is provided for manually forcibly pivoting the yoke to dispose the elongated pivot arm in the tightened position. A key lock mechanism is incorporated within the yoke for virtually locking the latch means while the latch means is positioned to latch the elongated pivot arm in the tightened position. In a preferred embodiment, the lever arm for manipulating the yoke is designed to overlay the key lock mechanism thereby protecting such key lock mechanism from the elements.

OBJECTS OF THE INVENTION

Accordingly, it is a primary object of this invention to provide a new and improved load binding apparatus which includes not only a positive latch to hold and maintain the load binder in a fully tightened position, but further includes an unexposed key lock mechanism to lock the positive latch in a latched position, thereby preventing unauthorized persons from tampering with and releasing the load binder, and preventing loss of the load during transportation, as well as safeguarding against theft of the load and/or load binder.

Another primary object of this invention is to provide a new and improved load binding apparatus which includes an internal, unexposed and tamper-proof positive latch to hold and maintain the load binder in a fully tightened position, and further includes an internal, unexposed and tamper-proof key lock mechanism to lock the positive latch in a latched position.

An additional object of this invention is to provide a new and improved load binding apparatus which not only includes a tamper-proof positive latch to hold and maintain the load binder in a fully tightened position, and a tamper-proof key lock mechanism to lock the positive latch in a latched position, but further provided means for shielding the key lock mechanism from the elements.

A further object of this invention is to provide a new and improved load binding apparatus which includes a two part lever arm for manually manipulating the yoke to a tightened position, which two part lever arm includes a pivotal lever arm portion adapted to overlay and shield a key lock mechanism and a removable extension arm.

These and other objects and advantages of this invention will become apparent after a full reading of the following detailed description, particularly when read in conjunction with the attached drawings as described below.

DESCRIPTION OF THE PREFERRED EMBODIMENTS OF THE INVENTION

Figure 1:
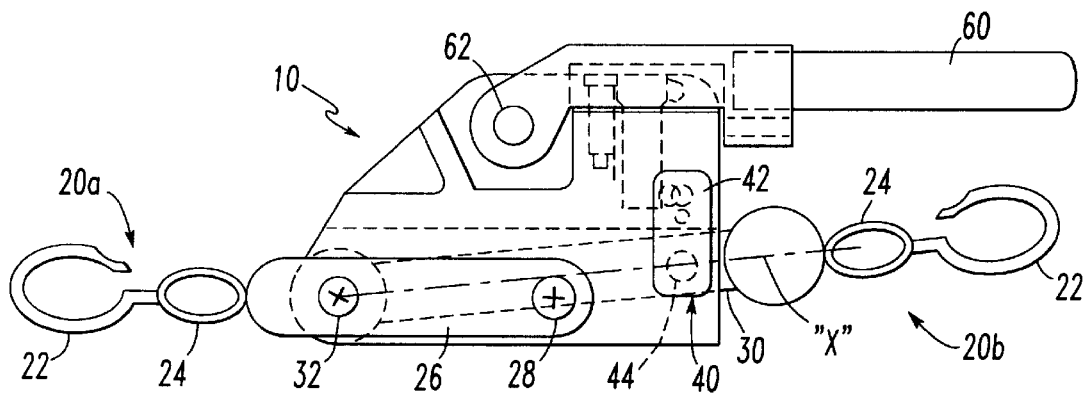
FIG. 1 is an elevational side view of a load binder, in accordance with a presently preferred embodiment of this invention, showing the elongated pivot arm in the closed position.

Prior to proceeding with a detailed description of the subject invention, it is noted that for the sake of clarity, identical components which have identical functions have been identified with identical reference numerals throughout the several views of the attached drawings.

Reference to the figures will illustrate two presently preferred embodiments of load binding apparats of this invention which, in essence, comprises a yoke 10 having a pair of parallel side faces 12 and a slot 14, in an underside face portion disposed midway between the two face portions 12. A first tension member 20a, such as a hook 22, which may or may not be secured at the end of steel cable or a small length of chain, or even a single chain link 24, is pivotally secured to said yoke 10 at about the mid-length of slot 14 by a bifurcated anchor 26 held in place by a pair of machine screws 28. Two independent machine screws 28 are utilized to secure anchor 24 to yoke 10, each having a length sufficient to penetrate only one face 12 of yoke 10 so that slot 14 is not blocked by either machine screw 28.

An elongated pivot arm 30, having a first end pivotally pinned at one end of slot 14 by a machine screw 32, is provided so that it is adapted for pivotal movement between an "open" position whereby the elongated pivot arm 30 extends outwardly from slot 14 and away from yoke 10, and a "closed" position whereby the elongated pivot arm 30 is fully disposed within the length of slot 14. Machine screws 28, at which first tension member 20a is pivotal, are aligned with machine screw 32 on which elongated pivot arm 30 is pivotal.

A second tension member 20b, such as a hook 22, which may or may not be secured at the end of a small length of chain, or even a single chain link 24, is pivotally secured to the distal end of pivot arm 30 disposed away from machine screw 32. The depth of slot 14 must be sufficient to permit pivot arm 30 to be pivoted into slot 14 to the "closed" position by a pivotal angle more than sufficient to permit the axis "x" of pivot arm 30 to pivot into slot 14 past the transverse axes of machine screws 28 on which first tension member 20a is pivotal, to thereby achieve an "over a dead-center position", with regard to machine screws 28. Accordingly, the tensioned ends, to which tension members 20a and 20b are connected, will be effectively locked by the tension force tending to pull apart tension members 20a and 20b by tending to effect rotation of pivot arm 30 beyond 90°; i.e., over the dead-center position.

Figure 4:
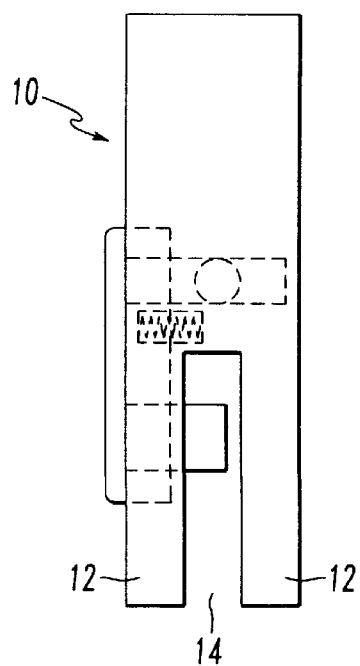
FIG. 4 is an end view of the yoke, as shown in FIG. 3, with the latch means shown with dashed lines.
Figure 5:
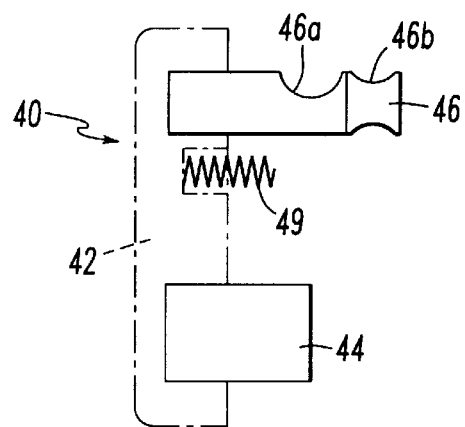
FIG. 5 is a side view of the latch means with the rectangular base member shown with dashed lines in order to better illustrate the cylindrical lock pins secured thereto.
Figure 6:
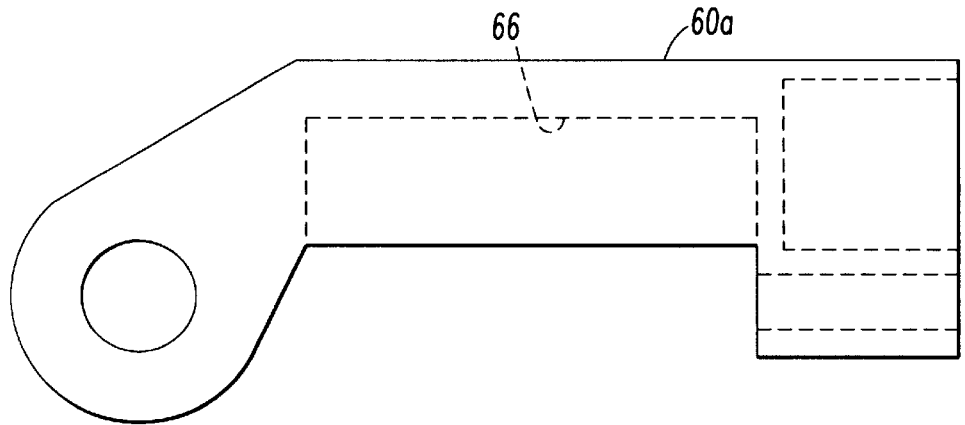
FIG. 6 is a side view of one embodiment of the lever arm pivotally attached to the yoke as shown in FIGS. 1 and 2.
Figure 7:
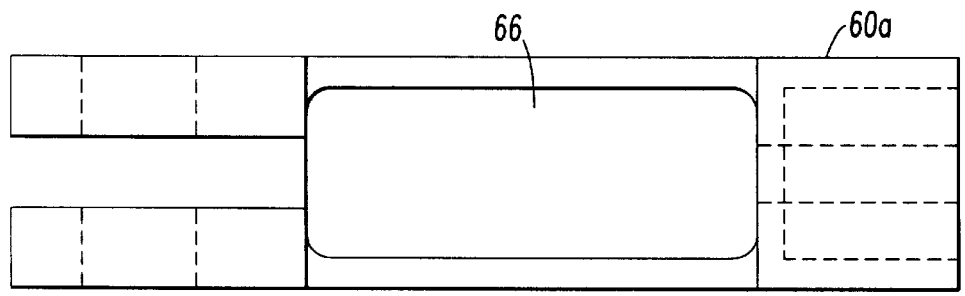
FIG. 7 is a bottom or underside view of the lever arm as shown in FIG. 6.
Figure 8:
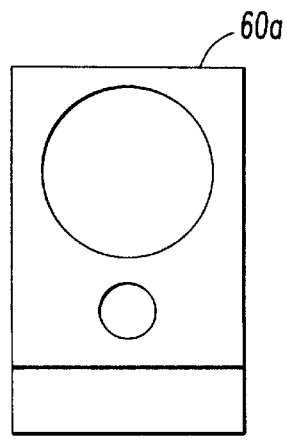
FIG. 8 is an outside end view of the lever arm as shown in FIGS. 6 and 7.
Figure 9:
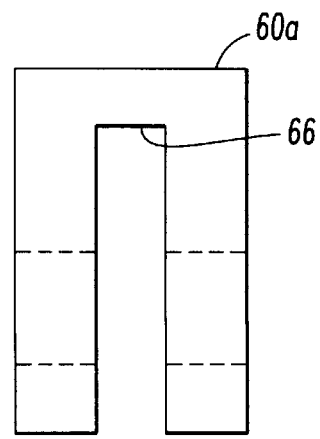
FIG. 9 is an inside end view of the lever arm as shown in FIGS. 6, 7 and 8.

A latch means 40, for latching pivot arm 30 in the "closed" position, comprises a three-dimensional, generally rectangular base member 42, having a pair of parallel, cylindrical pins 44 and 46 extending from one flat side surface, while one side surface 12 of yoke 10, is provided with a generally rectangular recess 16, adapted to receive base member 42. Cylindrical pin 44, is preferably cylindrical in form and adapted to fit into aperture 34 in elongated pivot arm 30 when pivot arm 30 has been pivoted to the "closed" position. The other pin 46 is provided with a partial cylindrical channel 46a in its top surface, and a circumferential groove 46b encircling the outer end, each of which are adapted to cooperate with a key lock mechanism 50, as will be described below. Base member 42 is also provided with a cylindrical aperture 48 between pins 44 and 46 which are adapted to receive a compression spring 49. The other end of compression spring 49 is received in a mating aperture 18 in yoke 10. As shown in the end view of FIG. 4, compression spring 49 permits latch means 40 to be spring loaded within rectangular recess 16 such that when biased outwardly, cylindrical pin 44 is not disposed across slot 14, thereby permitting elongated pivot arm 30 to pivot freely into and from slot 14. However, by manually pushing latch means 40 inwardly against compression spring 49 when elongated pivot arm 30 is in the "closed" position, cylindrical pin 44 will be inserted into aperture 34, thereby latching pivot arm 30 at such closed position. At the same time, pin 46 will be inserted into the key lock mechanism 50, as described below, to virtually lock latch means 40 in such latched position.

A pair of parallel cylindrical apertures 19 are provided in an upper surface of yoke 10 directly over pin 46 which are adapted to receive a key lock mechanism 50. The key lock mechanism 50 is adapted to engage pin 46 when latch means 40 is pushed inwardly so that pin 46 is engaged and held in place by lock mechanism 50. Such key lock mechanisms are well know to persons skilled in the padlock art and need not be described in great detail here. It is believed to be sufficient to note that the key lock mechanism 50, as utilized in the embodiment illustrated in the drawings of this disclosure, is of the general type as disclosed in U.S. Pat. No. 5,572,890, by Carpenter, and assigned to American Lock Company, which patent is incorporated herein by reference. As shown in the Carpenter patent, a lock housing is provided with a pair of parallel apertures substantially like those provided in yoke 10 which are adapted to receive a key lock mechanism adapted to lock against a padlock shackle leg conforming to the configuration of pin 46. It should be further noted that this particular padlock locking mechanism was merely one of many possibilities selected for use in the load binder of this invention, so it should be readily apparent that any one of a great number of different key lock mechanisms could be utilized without departing from the spirit of the invention. Accordingly, when latch means 40 is pushed into rectangular recess 16, cylindrical pin 46 in pushed into engagement with key lock mechanism 50 to virtually lock latch means 40 in such position, which effectively locks pivot arm 30 in the closed position. Accordingly, only by utilizing an unlocking key (not shown) within key lock mechanism 50, will latch means 40 be released sufficient to permit compression spring 48 to bias latch means 40 outwardly, to thereby release pivot arm 30 from being latched in the closed position.

Figure 10:
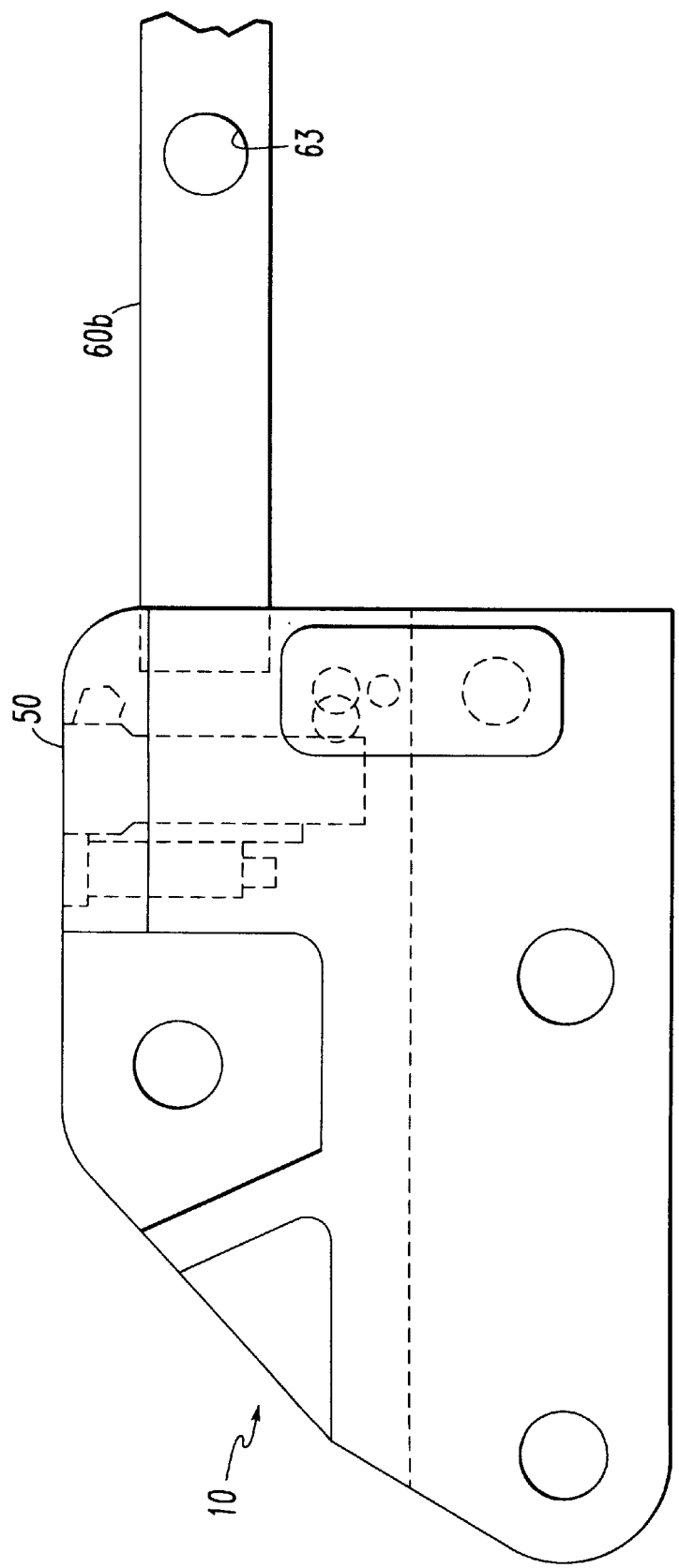
FIG. 10 is a side view of the yoke, substantially as shown in FIG. 4, except it utilizes a rigid non-pivotal lever arm insertable into an aperture in the side of the yoke.

In a simplified embodiment, as shown in FIG. 10, a manipulating lever arm 60a is attachable to yoke 10 such that manipulating lever arm 60a will extend therefrom in a direction perpendicular to the axis of machine screw 32. Since second tension member 20b will normally be secured to some other load holding member (not shown), it will not normally be easy or even possible to directly pivot arm 30 into slot 14, so that instead yoke 10 itself will have to be pivoted relative to pivot arm 30. In actuality, then yoke 10 and slot 14 will normally be pivoted onto pivot arm 30 in order to position lever arm 30 into the closed position within slot 14. As can be seen from the drawings, by forcibly pushing lever arm 60a downward in a clockwise direction as viewed in the drawing, yoke 10 will be pivoted clockwise on machine screw 42 with reference to elongated pivot arm 30, thereby forcing yoke 10 and slot 14 onto pivot arm 30 to dispose it into the closed position.

Figure 2:
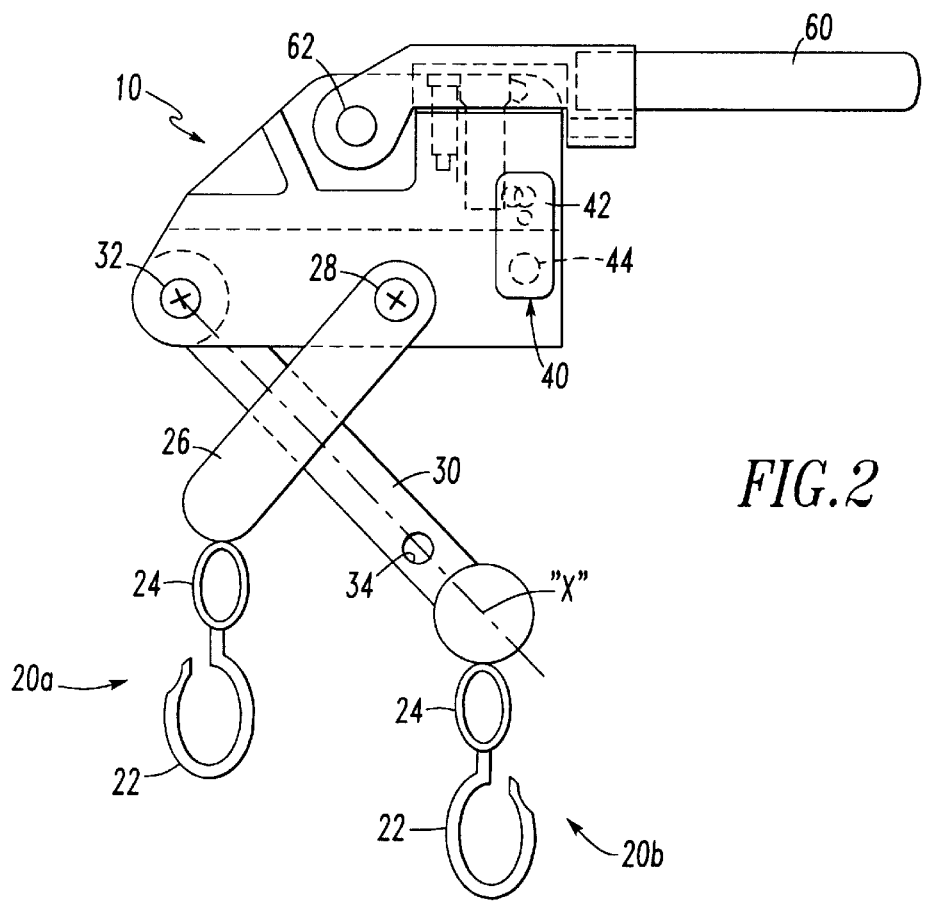
FIG. 2 is the same as FIG. 1 except that the elongated pivot arm is shown in the open position and the lever arm extension has been removed.
Figure 3:
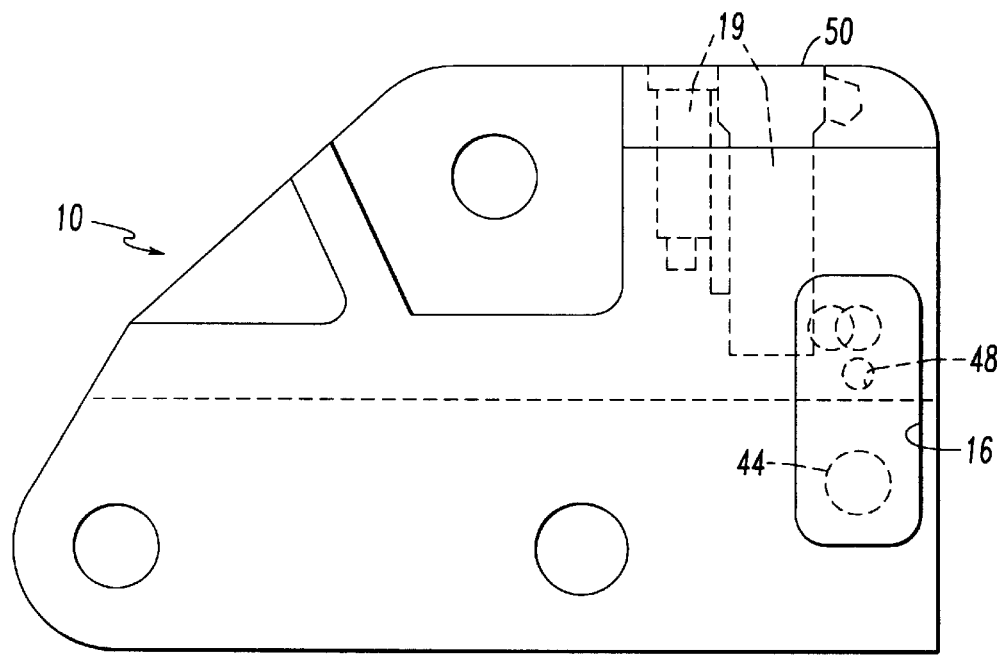
FIG. 3 is a side view of the yoke portion of the load binder shown in FIGS. 1 and 2.

In a preferred embodiment, as shown in FIGS. 1 and 2, a modified manipulating lever arm 60b is pivotally secured to yoke 10 at axle pin 62 having an axis perpendicular to the axis of machine screw 32 on which pivot arm 30 is pivotal, with lever arm 60b including an aperture 63 in its outer end adapted to receive an extension bar 64. Lever arm 60b further includes a boxed-in flat bottom surface 66 adapted to abut against the upper surface of yoke 10 housing the key lock mechanism 50. As shown in the drawings, the upper portion of yoke 10 housing key lock mechanism 50 has a slightly narrowed rectangular configuration so that the boxed-in surface 66, will fit thereover like a protective lid, shielding the key lock mechanism 50 from the elements. To provide access to the key lock mechanism 50, lever arm 60b must be pivoted counterclockwise (with reference to the drawings) on axle pin 62 pin 62 thereby lifting boxed-in flat surface 66 from the key lock mechanism 50. To function as a manipulating lever arm to pivot yoke 10, as necessary to position elongated pivot arm 30 into the closed position, manipulating lever arm 60b must be fully pivoted clockwise so that bottom surface 66 is disposed against the upper surface of yoke 10, and any such further pivotal force will cause yoke 10 to be pivoted on machine screw 32. If desired, a rubber insert 68 can be placed against bottom surface 66 to at least partially waterproof the key lock mechanism 50.

While a simplified and a preferred embodiment of the apparatus of the present invention have been described in detail above, it should be apparent to persons having ordinary skills in mechanical arts that various other embodiments, adaptations and modifications of the invention could be made without departing from the spirit and scope of the invention. As already noted, for example, the lever arms 60a or 60b can take any one of a number of different forms being directly attached or attachable to yoke 10 as in the case of lever arm 60a, or be pivotally attached as in the case of lever arm 60b. Indeed, whatever type of form of lever arm 60 is used, all that is required is that it be a lever extending from yoke 10 which can be manually manipulated to pivot yoke 10 with respect to pivot arm 30. Accordingly, it can be any form of lever arm extending from yoke 10 transversely to the axis of machine screw 32. As another possible modification, it has already been noted that there are a great number of different key lock mechanisms 50 that could be utilized, such as, practically any key lock mechanism as utilized in padlocks and other forms of locks. Obviously, to the extent that modified key lock mechanisms 50 are utilize, it may be necessary to modify the form of latch means 40, or at least cylindrical lock pin 46 extending therefrom as necessary to cooperate with whatever lock mechanism is utilized.

It should also be apparent that the latch means 40 can take any one of a number of different forms as long as it is adapted to latch pivot arm 30 in the closed position, and that ever the yoke 10 and elongated pivot arm 30 can each be modified through a wide range of variations, without departing from the spirit of this invention.

I claim:

1. An over-center load binding apparatus for interconnecting two tension members and tightening them towards one another, said load binding apparatus comprising:

a yoke, a first tension member pivotally connected to said yoke, an elongated pivot arm having a first end pivotally connected to said yoke, a second tension member pivotally connected to a second end of said elongated pivot arm, said elongated pivot arm adapted to be pivotal between an open position and a closed position whereby said second end thereof to which said second tension member is connected, will pass arcuately around said first tension member to an over dead-center position, a lever arm connectable to said yoke for forcibly pivoting said yoke to dispose said elongated pivot arm in said closed position, a latch means for latching said elongated pivot arm in said closed position, and a key lock mechanism incorporated within said yoke for locking said latch means when said latch means has latched said elongated pivot arm in said closed position.

2. An over-center load binding apparatus, according to claim 1, in which said first and second tension members each comprise at least a hook.

3. An over-center load binding apparatus, according to claim 1, in which said first tension member is pivotally connected to said yoke through a bifurcated anchor.

4. An over-center load binding apparatus, according to claim 1, in which said yoke comprises a metal casting having a slot in one surface thereof, and said elongated pivot arm comprises a metal arm pivotally pinned to said yoke for pivotal movement within said slot.

5. An over-center load binding apparatus, according to claim 4, in which said elongated pivot arm in said open position extends outwardly from said slot and away from said yoke, and in said closed position a major portion thereof is longitudinally disposed within said slot.

6. An over-center load binding apparatus, according to claim 1, in which said lever arm is pivotally connected to said yoke and adapted to receive an extension bar.

7. An over-center load binding apparatus, according to claim 6, in which said lever arm is provided with a protective side surface adapted to overlay and shield said key lock mechanism.

8. An over-center load binding apparatus, according to claim 7, in which said protective side surface is a boxed-in surface adapted to fit like a box lid over a portion of said yoke housing said key lock mechanism.

9. An over-center load binding apparatus, according to claim 1, in which said latch means for latching said elongated pivot arm in said closed position is manually operable to effect such latching.

10. An over-center load binding apparatus, according to claim 9, in which said latch means for latching said elongated pivot arm in said closed position can be unlatched only by unlocking said key lock mechanism.

11. An over-center load binding apparatus for interconnecting two tension members and tightening them towards one another, said load binding apparatus comprising:
a yoke,
a first tension member pivotally connected to said yoke at a first point of connection,
an elongated pivot arm having a first end pivotally connected to said yoke at a second point of connection,
a second tension member pivotally connected to a second end of said elongated pivot arm,
said elongated pivot arm adapted to be pivotal at said second point of connection between an open position and a closed position whereby said second end thereof to which said second tension member is connected, will pass arcuately around said first point of connection to an over dead-center position,
a lever arm connectable to said yoke for forcibly pivoting said yoke to dispose said elongated pivot arm in said closed position,
a latch means for latching said elongated pivot arm in said closed position, and
a key lock mechanism incorporated within said yoke for locking said latch means when said latch means has latched said elongated pivot arm in said closed position.

12. An over-center load binding apparatus, according to claim 11, in which said first and second tension members each comprise at least a hook.

13. An over-center load binding apparatus, according to claim 11, in which said first tension member is pivotally connected to said yoke through a bifurcated anchor.

14. An over-center load binding apparatus, according to claim 11, in which said yoke comprises a metal casting having a slot in one surface thereof, and said elongated pivot arm comprises a metal arm pivotally pinned to said yoke for pivotal movement within said slot.

15. An over-center load binding apparatus, according to claim 14, in which said elongated pivot arm in said open position extends outwardly from said slot and away from said yoke, and in said closed position a major portion thereof is longitudinally disposed within said slot.

16. An over-center load binding apparatus, according to claim 11, in which said lever arm is pivotally connected to said yoke and adapted to receive an extension bar.

17. An over-center load binding apparatus, according to claim 16, in which said lever arm is provided with a protective side surface adapted to overlay and shield said key lock mechanism.

18. An over-center load binding apparatus, according to claim 17, in which said protective side surface is a boxed-in surface adapted to fit like a box lid over a portion of said yoke housing said key lock mechanism.

19. An over-center load binding apparatus, according to claim 11, in which said latch means for latching said elongated pivot arm in said closed position is manually operable to effect such latching.

20. An over-center load binding apparatus, according to claim 19, in which said latch means for latching said elongated pivot arm in said closed position can be unlatched only by unlocking said key lock mechanism.

* * * * *